(12) United States Patent
Larsen et al.

(10) Patent No.: US 8,705,787 B2
(45) Date of Patent: Apr. 22, 2014

(54) CUSTOM IN-EAR HEADSET

(75) Inventors: Jan Larsen, Smørum (DK); Jon Hjersing Sparre, Smørum (DK); Steen Iversen, Roskilde (DK)

(73) Assignee: Nextlink IPR AB, Malmo (SE)

( * ) Notice: Subject to any disclaimer, the term of this patent is extended or adjusted under 35 U.S.C. 154(b) by 158 days.

(21) Appl. No.: 12/963,382

(22) Filed: Dec. 8, 2010

(65) Prior Publication Data

US 2011/0135120 A1 Jun. 9, 2011

Related U.S. Application Data

(60) Provisional application No. 61/267,976, filed on Dec. 9, 2009.

(51) Int. Cl.
*H04R 25/00* (2006.01)

(52) U.S. Cl.
USPC ............. 381/380; 381/151; 381/328; 381/72; 181/135; 181/129; 181/130; 181/131

(58) Field of Classification Search
USPC ............ 381/151, 380, 328, 72; 181/135, 129, 181/130, 131
See application file for complete search history.

(56) References Cited

U.S. PATENT DOCUMENTS

| | | | |
|---|---|---|---|
| 4,353,364 A | 10/1982 | Woods | |
| 5,763,503 A * | 6/1998 | Cowperthwaite et al. | 522/44 |
| 5,769,891 A * | 6/1998 | Clayton | 623/10 |
| 6,022,311 A * | 2/2000 | Juneau et al. | 600/25 |
| 6,129,175 A | 10/2000 | Tutor et al. | |
| 6,367,578 B1 * | 4/2002 | Shoemaker | 181/135 |
| 6,493,454 B1 * | 12/2002 | Loi et al. | 381/328 |
| 6,724,902 B1 | 4/2004 | Shennib et al. | |
| 2009/0154748 A1 * | 6/2009 | Baker et al. | 381/328 |

FOREIGN PATENT DOCUMENTS

| | | |
|---|---|---|
| EP | 1640972 A1 * | 3/2006 |
| WO | 01/76520 A1 | 10/2001 |
| WO | 2008/157557 A1 | 12/2008 |
| WO | 2009/125186 A1 | 10/2009 |

OTHER PUBLICATIONS

International Search Report corresponding to co-pending International Patent Application Serial No. PCT/EP2010/069247, European Patent Office, dated Feb. 22, 2011; (4 pages).

* cited by examiner

*Primary Examiner* — Duc Nguyen
*Assistant Examiner* — Taunya McCarty
(74) *Attorney, Agent, or Firm* — Nixon Peabody LLP

(57) ABSTRACT

A custom in-ear headset. The headset includes a housing having a proximate housing portion and a distant housing portion. The distant housing portion is shaped and sized to fit inside an ear canal of a user. The headset includes a miniature speaker that is acoustically coupled to a sound outlet in the distant portion of the housing for conveying sound pressure to an ear canal of the user. The headset further includes any one or more of: (a) a microphone with a sound inlet in the proximate housing portion, (b) a bone conduction microphone arranged in the distant housing portion, or (c) a microphone with a sound inlet in the distant housing portion. The headset further includes at least one ridge projecting from and circumscribing the distant housing portion.

26 Claims, 1 Drawing Sheet

CUSTOM IN-EAR HEADSET

CROSS-REFERENCE TO RELATED APPLICATION

This application claims the benefit of U.S. Provisional Application Ser. No. 61/267,976, filed Dec. 9, 2009, entitled "A Custom In-Ear Headset."

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to a custom in-ear headset which comprises a distant housing portion with a ridge projecting from and circumscribing the distant housing portion. The distant housing portion is shaped and sized to fit inside an ear canal of a user so as to acoustically seal the user's ear canal against environmental sound.

BACKGROUND OF THE INVENTION

Custom in-ear headsets are well-known in the art and used to facilitate one-way or two-way communication between a headset user and a distant talker. The custom in-ear headset may be coupled to a mobile terminal which transmits audio signals to the in-ear headset via a wired or wireless communication channel. During normal operation, a distant housing portion of the in-ear headset is fitted into the user's or wearer's ear canal. This distant housing portion often comprises a loudspeaker coupled to a sound outlet of the distant housing portion so that audio signals received from the distant talker are processed and transmitted to the user's ear canal, or more specifically to an essentially sealed ear canal volume residing in front of a tympanic membrane or eardrum. For receipt of the user's own voice, an important type of custom in-ear headsets are adapted to pick up the user's voice in or at the user's ear canal by sound transmission through the user's tissue and bone structures. The voice pick-up may be effected by a bone conduction microphone in vibratory contact with a wall section of the user's ear canal or an airborne sound microphone having a sound inlet arranged inside the essentially sealed ear canal volume of the user. A distinctive advantage of this type of sound pick up is good suppression of environmental noise in the microphone signal to be transmitted to the distant listener allowing the user's speech to be conveyed with high fidelity and intelligibility even when the user is located in a very noisy acoustical environment.

However, creating effective sound sealing around the housing of prior art in-ear headset devices to block or suppress leakage of environmental noise to the user's essentially occluded ear canal remains a significant challenge. Since an airborne sound microphone inside the user's ear canal is inherently sensitive to airborne sound and any practical bone conduction microphone also has a certain (undesired) sensitivity to airborne sound, acoustical leakage of environmental sound around the housing will decrease the fidelity and intelligibly of the sound picked up. Likewise, effective sound sealing against the user's ear canal is also beneficial if the custom in-ear headset is configured to act as an active hearing protector attenuating environmental sound and noise above a preset sound level to protect the user's hearing.

One obstacle to reach effective sound sealing or sound attenuation is the varying or dynamic geometry or shape of the user's ear canal caused by user activity such as chewing, eating, yawning etc which leads to the formation of a time-varying acoustic leakage path around the housing. Another obstacle to effective sound sealing is user comfort. Even though a very tightly fitted housing geometry, for example a deliberately oversized housing geometry, could provide good sound sealing it has proven to lead to unacceptable wearing comfort by exerting painful pressure on a large portion of the user's ear canal.

For hearing aid housings, where adequate attenuation of acoustical feedback between a hearing aid receiver and microphone often is of concern, it has been proposed to mount soft silicone rings or annular closed cell foam devices around hard shell hearing aid housings. This type of soft sealing devices are intended to provide sound or acoustical sealing of the user's ear canal with acceptable wearing comfort even during the above-described dynamic shape variations of the user's ear canal.

Patent specification U.S. Pat. No. 6,129,175 discloses an earpiece of polyvinyl chloride plastisol to be inserted into a user's ear canal and be compressed or deformed to acoustically seal the ear canal. The nose or the outermost portion of the earpiece comprises a number of deformable and highly flexible discs for the purpose of creating multiple layers of sound blocking and for enhancing comfort.

Patent specification WO 2009/125186 discloses an ear tip or ear plug with a body portion having flexible peripheral rib elements projecting there from to provide a comfortable and secure fit in a wearer's ear. The rib elements (and e.g. also the entire earpiece) are so flexible that they deform against the surface of the ear or ear canal to form an effective seal. The ear tip or ear plug is a generic earpiece, i.e. not one which is custom-made for a particular user.

The present inventors have, however, experimentally demonstrated that utilizing a substantially hard ridge projecting from and circumscribing a distant housing portion of the custom in-ear headset leads to a surprising improvement of the acoustical sealing of the user's ear canal when the ridge is pressed against a relatively soft cartilaginous portion of the user's ear canal. This arrangement of the ridge allows the ridge to contact and displace an annular wall portion of the soft cartilaginous ear canal that is sufficiently small to avoid serious discomfort. This is different from having soft and flexible ridges or other elements that deform against the ear or ear canal.

SUMMARY OF THE INVENTION

According to a first aspect of the invention, there is provided a custom in-ear headset comprising:
  a housing comprising a proximate housing portion and a distant housing portion, the distant housing portion being shaped and sized to fit inside an ear canal of a user,
  at miniature speaker acoustically coupled to a sound outlet in the distant portion of the housing for conveying sound pressure to an ear canal of the user,
  at least one of
    a microphone 103 with a sound inlet 124 in the proximate housing portion 104,
    a bone conduction microphone 105 arranged in the distant housing portion 106, and/or
    a microphone 130 with a sound inlet 126 in the distant housing portion 106, and at least one ridge 201, 203 projecting from and circumscribing the distant housing portion 106.

In accordance with an aspect of the invention, the housing comprises at least one ridge projecting from and circumscribing the distant housing portion. The at least one ridge and the distant housing portion, and/or the at least one ridge and the housing, and/or the proximate housing portion and the distant housing portion may integrally be formed in a same material for example as a cured photopolymer resin or fused powder. However, in some embodiments the at least one ridge and the distant housing portion may be manufactured as separate parts that are glued, fused, welded or otherwise bonded to each other during manufacturing of the housing of the present custom in-ear headset. The at least one ridge and the distant housing portion may alternatively be integrally formed but in different materials in a single manufacturing step e.g. through application of 3-D printing systems that allows simultaneous use of multiple printing materials. One suitable 3-D printing system is available from Objet Geometries Inc. North America under the trade names EDEN260 and ALARIS™30 3D desktop printers. An accompanying range of suitable printing materials are also available from this manufacturer as discussed in detail below.

The present inventors have experimentally demonstrated that at least one hard ridge leads to a surprising improvement of the acoustical sealing of the user's ear canal when the ridge is pressed against a cartilaginous portion of the user's ear canal. An appropriate hardness and placement of the ridge(s) inside the user's ear canal allows the ridge(s) to contact and displace an annular wall portion of the soft cartilaginous ear canal. In this manner, the acoustical sealing effect is obtained by the displacement of the annular wall portion of the soft cartilaginous ear canal conforming to the mating shape of the ridge(s) rather than housing deformation. Preferably, the ridge(s) has a Shore D hardness larger than 40 such as larger than 60, or even more preferably larger than 80.

Furthermore, it is preferable to select dimensions of the at least one ridge so as to maintain a contact area between the ridge(s) and soft cartilaginous ear canal wall that is small enough to avoid serious user discomfort. In one embodiment, the at least one ridge has a height between 0.3 mm and 1.0 mm and a width between 0.5 mm and 5.0 mm. The width of the ridge(s) lies even more preferably between 0.5 mm and 2.5 mm.

The at least one ridge is preferably unbroken to provide effective acoustical sealing around the entire circumference of the distant housing portion but may alternatively include one or more minor gaps and still provide a certain degree of improvement of the acoustical sealing properties of the housing of the present custom in-ear headset.

As mentioned above, the at least one ridge provides a surprising improvement of the acoustical sealing of the user's ear canal when pressed against a cartilaginous portion of the user's ear canal. This effect is accordingly obtained by shaping and sizing the housing so as to fit the ridge(s) in a cartilaginous portion of the ear canal of the user. Given the anatomy of the human ear, the cartilaginous portion of a human ear canal is situated outwardly relative to a second bend of the ear canal toward an ear canal entrance. According to this definition, the second bend is the bend closest to the ear drum. An appropriate way of shaping and sizing the housing may comprise making an ear canal impression and building a corresponding mould with at least one ridge formed therein. An appropriate position of the ridge(s) may be determined by a skilled ear plug/shell technician from inspection of features and dimensions of the ear impression or in other suitable ways.

In other embodiments, the user's ear canal may be directly scanned and a digital representation thereof formed in a suitable computer application program. An appropriately dimensioned housing contour adhering closely to the often highly irregular ear canal shape may be derived from the digital representation of the user's ear canal. The ridge(s) may subsequently be dimensioned and added manually at an appropriate location of the digital representation of the housing contour by an operator or shell technician. Alternatively, the ridge(s) may be dimensioned and located in an automated or semi-automated way. Finally, the finished housing may be directly printed by a 3-D printing system loaded with appropriate printing materials.

The sound outlet in the distant housing portion may be arranged proximate to a tip of the housing to allow for unblocked sound transmission toward the user's eardrum during normal operation of the custom in-ear headset. A miniature loudspeaker may be coupled to the sound outlet through a suitable acoustical channel or conduit such as a piece of flexible tube. The miniature loudspeaker may be positioned inside the distant housing portion for example in close proximity to the tip or it may be placed a distance away from the tip for example in an interior space of the proximate housing portion and coupled to the sound outlet by an acoustical channel of suitable length. The miniature loudspeaker may comprise an electro-dynamic speaker, electret based loudspeaker or a balanced armature hearing aid receiver such as Sonion 2300-series or 2600-series of receivers.

According to a preferred embodiment of the invention, the distant housing portion comprises a first and a second ridge (or even further ridges) projecting from and circumscribing the distant housing portion to further improve the acoustical sealing or sound attenuation of the housing during normal operation in the user's ear. The second ridge may have approximately identical dimensions to the first ridge in terms of width and height or the second ridge may have different dimensions. Due to an often highly irregular shape of the distant housing portion (conforming to the irregular shape of the user's ear canal) and the distance between the first and second ridges their circumference may be quite different. The first and second ridges may be oriented essentially equidistant from each other, i.e. parallelly oriented, or the distance may vary even widely around the distal housing circumference. In both cases, the smallest distance between the first and second ridges, measured in tangential direction to the first ridge, is preferably larger than 1.0 mm and less than 5.0 mm.

Several variations or embodiments for picking up the user's voice in the present custom in-ear head set are possible. In one embodiment, the microphone with a sound inlet located in the proximate housing portion ("proximate microphone") is adapted to pick-up and transmit the user's voice, and other environmental sounds, to a distant listener. This microphone placement generally allows receipt and transmission of the user's voice in full bandwidth and therefore good fidelity. However, environmental sound such as competing noise sources are picked-up equally well and may lead to lower fidelity and intelligibility if the user is located in a noisy environment like a train station, bar, etc.

In another embodiment, microphone signals picked up by the proximate microphone is not transmitted to the distant listener but instead to the user's eardrum through the miniature speaker and the sound outlet. This functionality is often designated "hear thru" in the art and may provide the user with a helpful awareness of the acoustical environment surrounding the user. In this latter situation, the custom in-ear headset preferably also comprises at least one of the bone conduction microphone arranged in the distant housing portion and the microphone with a sound inlet in the distant housing portion to pick up and transmit the user's voice.

In yet another embodiment, the custom in-ear headset comprises the microphone with the sound inlet located in the distant housing portion ("distal microphone"). According to this embodiment the user's voice is picked up inside the occluded ear canal in front of the user's ear drum. The sound inlet of the microphone is often arranged in close proximity to the sound outlet from the miniature speaker in a tip of the distal housing portion. The user's voice is transmitted through the user's tissue and the ear canal wall to the occluded ear canal in front of the user's ear drum where sound is picked up by the distal microphone. This type of voice pick-up bears some resemble to the operation of a bone conduction microphone because received sound is in both cases caused by sound transmission through the user's tissue and bone structures. The bone conduction microphone preferably comprises a flexible cap, for example comprising an elastomeric material, which is brought into physical contact with the user's ear bone to pick up and transmit vibratory movement caused by the user's voice.

In yet another embodiment, the custom in-ear headset comprises both a proximate microphone and one of a distal microphone and a bone conduction microphone. This embodiment may comprise advanced noise reduction and/or cancellation algorithms based on a combination of microphone signals from the proximate microphone and the bone conduction microphone. The superior suppression of environmental noise in the microphone signal generated by the bone conduction microphone or the distal microphone may be used to identify speech activity of the user or voiced speech segments.

In a preferred embodiment, the custom in-ear headset comprises exclusively one of: the bone conduction microphone arranged in the distant housing portion, and the microphone with the sound inlet in the distant housing portion.

According to this embodiment, the sound/vibration received by the bone conduction microphone or the distal microphone is substantially exclusively caused by sound transmission through the user's tissue and bone structures due to the acoustical sealing provided by the shape of the housing and the mentioned provision of at least one ridge.

A further improvement in suppression of environmental sound is obtained in an embodiment wherein the bone conduction microphone comprises a vibration pickup member located distantly relative to a first ridge in a direction toward the tip of the housing or the distal microphone has the sound inlet located distantly relative to the first ridge in a direction toward the tip of the housing. The location of the vibration pickup member or the sound inlet behind the first ridge, or behind both of the first and second ridge in embodiments comprising two ridges, provides additional attenuation of environmental sound and noise, including the user's airborne voice, at the sound inlet of the distal microphone or at the vibration pick-up member. Since any practical bone conduction microphone has a certain (undesired) sensitivity to airborne sound, the additional sound attenuation provided by the first ridge is very advantageous. As previously mentioned, good suppression of environmental noise leads to superior noise suppression in the microphone signal to be transmitted to the distant listener so as to allow speech of high fidelity and intelligibility from the bone conduction microphone to be transmitted to the distant listener even when the user is located in a very noisy acoustical environment.

The housing may be fabricated by different manufacturing technologies such as rapid prototyping, including Stereolithography (SL) and 3-D printing technologies, which allow building of hard hollow shells from individually scanned ear canal data. One suitable 3-D printing system is available from Objet Geometries Inc. North America under trade names EDEN260 and ALARIS™30 3D desktop printers. In the latter fabrication technology, the housing material may comprise one or more photopolymer resins, such as ultraviolet curable resins available through Objet Geometries Inc. North America and marketed under trade names FULLCURE®630, FULLCURE®655, FULLCURE®680, FULLCURE®720, VEROWHITE™, VEROBLUE™, VEROONE BLACK™.

In other embodiments, the housing comprises a hard acrylic ester copolymer molded in a silicone mould according to traditional custom shell fabrication technologies. The Shore D hardness of the distal housing portion outside the ridge or ridges may be smaller than the Shore D hardness of the ridge or ridges or about the same. Naturally, if the distal housing portion and the ridge(s) are integrally formed in the same material, the Shore D hardness will be substantially identical.

According to a preferred embodiment, an interior volume of the distant housing portion comprises a filling material or housing material to provide a solid tip in the distant housing portion. The filling material or housing material may extend in proximal direction to a level above the ridge(s) to attenuate vibration and sound transmission from the tip of the housing. The filling material may comprise an elastomeric compound such as silicone injected into a hollow tip of the distal housing portion. The filling material may fully or partly enclose the miniature loudspeaker if the latter is arranged in the tip.

The custom in-ear headset comprises a signal processor or one or more analog amplifier circuits adapted for receipt and processing of at least one of:

a first microphone signal generated by the microphone with the sound inlet in the proximate housing portion, a second microphone signal generated by the bone conduction microphone arranged in the distant housing portion, and a third microphone signal generated by the microphone with a sound inlet in the distant housing portion.

The signal processor may comprise a Digital Signal Processor ("DSP") or microprocessor adapted to process a digitally formatted or digital version of the one or more of the first, second and third microphone signals. Alternatively, one or more analog amplifier circuits is adapted to process the one or more of the first, second and third microphone signals. The digital version of the one or more microphone signals may be provided by respective A/D converters, or a single multiplexed A/D converter, operatively coupled in-between the distal microphone and the signal processor, the proximal microphone and the signal processor, or the bone conduction microphone and the signal processor.

The signal processor or the one or more of the first, second and third microphone signals may be adapted to amplify and filter, for example highpass and/or lowpass filter, one or more of the first, second or third microphone signals to suppress noise and/or enhance fidelity of these signals before transmission to the distant listener. The signal processor may comprise a software programmable or a hard-wired Digital Signal Processor ("DSP").

Another aspect of the invention relates to a customized hollow shell for placement in an ear canal of a user. The customized hollow shell comprises a proximate shell portion terminating at an outwardly oriented shell face, a distant shell portion shaped and sized to fit inside an ear canal of a user, at least one ridge projecting from and circumscribing the distant shell portion.

The customized hollow shell may be fabricated by the 3-D printing systems and accompanying materials mentioned above using the same manufacturing technologies. The dimensions and materials of the ridge or ridges and distant shell portion may be similar to those mentioned above for the distant housing portion of the custom in-ear headset. The customized hollow shell may form part of the housing of various types of in-ear mountable acoustical devices such as hearing prostheses, active or passive hearing protectors, wired or wireless headsets etc.

In an embodiment, the outwardly oriented shell face comprises opening for receipt of a signal processor assembly and the distant shell portion comprises a sound outlet. This embodiment may be formed as an active hearing protector or a hearing instrument wherein a miniature loudspeaker is coupled to the sound outlet and supplies appropriately processed sound to the user's ear canal. The miniature loudspeaker may be coupled to the sound outlet through a suitable acoustical channel or conduit such as a piece of flexible tube. The miniature loudspeaker may be positioned inside the distant shell portion for example in close proximity to the tip or it may be placed further away in the proximate shell portion and coupled to the sound outlet by an acoustical channel of suitable length. The signal processor assembly may comprise a Digital Signal Processor mounted on a carrier such as a ceramic substrate or printed circuit board. The distant shell portion may be terminated by a tip pointing towards the user's eardrum. The tip preferably comprises the sound outlet to allow for unblocked sound transmission toward the user's eardrum during normal operation.

BRIEF DESCRIPTION OF THE DRAWINGS

A preferred embodiment of the invention will be described in more detail in connection with the appended drawings, in which.

DETAILED DESCRIPTION OF EMBODIMENTS OF THE INVENTION

Figure 1:
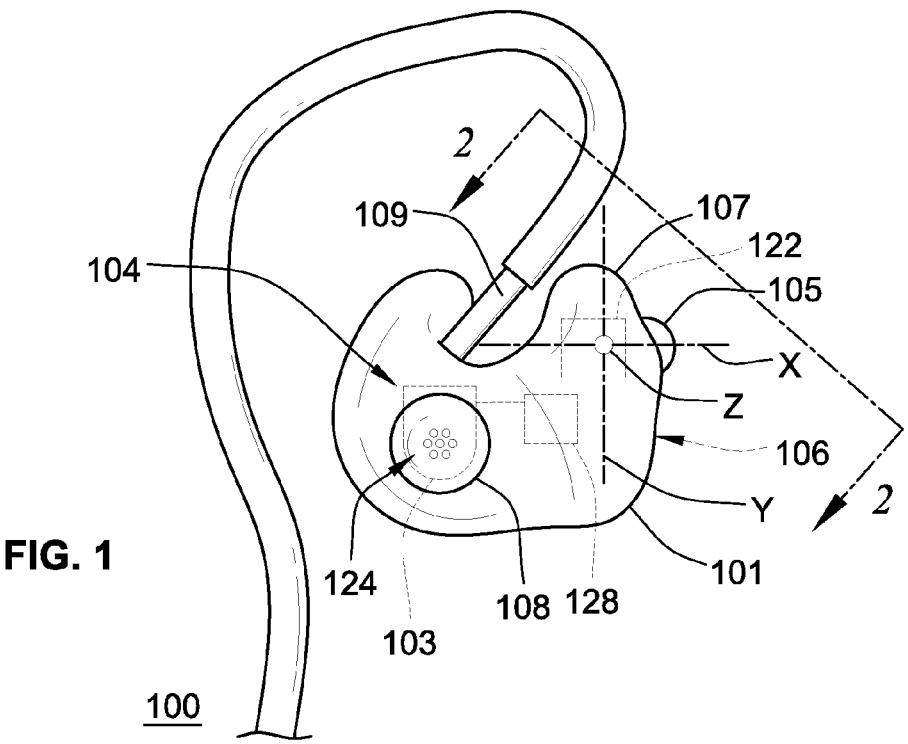
FIG. 1 depicts a custom in-ear headset according to a preferred embodiment of the invention.

FIG. 1 shows a custom in-ear headset 100 comprising a headset housing 101 having a proximate housing portion 104 and a distant housing portion 106. The distant housing portion, as indicated by arrow 106, is generally the part being closest to the user when the in-ear headset 100 is worn by the user while the proximate housing portion, as indicated by hashed arrow 104, is generally the part being furthest away from the user when the in-ear headset is worn by the user. The proximate housing portion 104 is terminated by a closed shell face 108 that point outwardly of the user's ear when the custom in-ear headset 100 is mounted therein. The distant housing portion 106 has a tapering outer contour terminating in a tip 205 (refer to FIG. 2) also comprising a sound outlet 120 of a miniature speaker 122 for conveying sound pressure to the user's substantially occluded ear canal. The tip 205 is accordingly the most distant portion of the headset housing 101 and generally pointing towards the user's ear drum, when the custom in-ear headset 100 is arranged in the user's ear during normal operation.

The headset housing 101 has as generally irregular outer contour since it is shaped and sized to fit the user's ear canal geometry and possibly a part of the user's auricle. The headset housing 101 comprises a customized hollow shell fabricated from an impression or scan of the user's canal. An electrical cable 109 serves as a wired two-way communication channel carrying the user's speech, picked-up by the bone conduction microphone 105 (BCM), to a mobile terminal and the speech of a distant talker to the miniature loudspeaker 122 mounted inside the headset housing 101. The BCM 105 comprises a vibration pickup member in form of a flexible elastomeric cap arranged close to the tip 205. When the custom in-ear headset 100 is mounted in the user's ear, the flexible elastomeric cap is brought in vibratory contact with a wall of the user's ear canal allowing pick up of the user's bone conducted voice transmitted through tissue and bone structures.

The present embodiment also comprises a second microphone which, oppositely to the BCM 105, is adapted to receive air borne sound in form of the so-called hear thru microphone 103. The hear thru microphone 103 has a sound inlet 124 in the closed shell face 108 of the proximate housing portion 104. In the present custom in-ear headset, signals received by the hear thru microphone 103 are amplified by a signal processor 128 mounted on a carrier inside the headset housing 101. An amplified or buffered microphone signal from the hear thru microphone 103 is applied to the miniature speaker to provide the user with a degree of acoustical awareness and comfort by the ability to perceive the surrounding acoustical environment.

Figure 2:
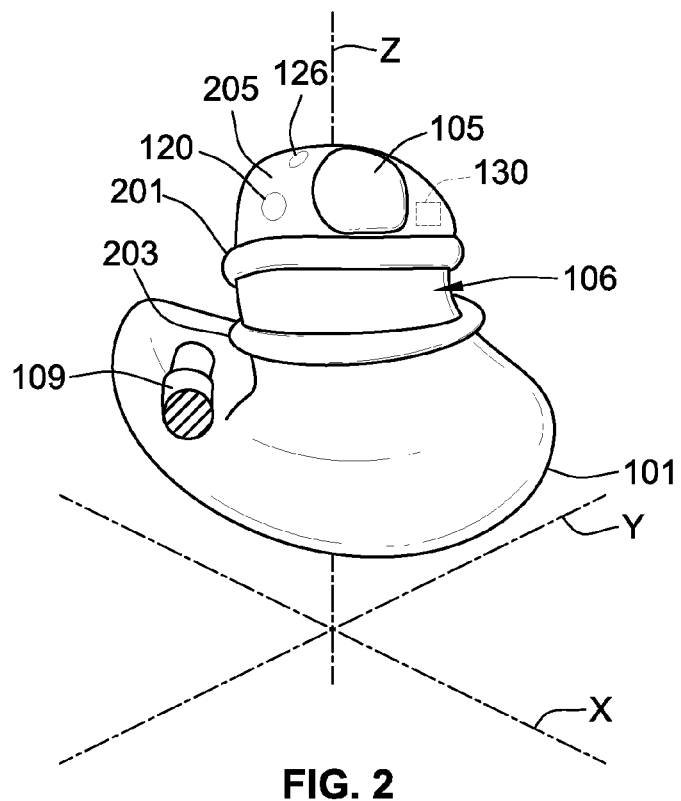
FIG. 2 is a tip view of the custom in-ear headset depicted on FIG. 1 illustrating a pair of spaced substantially parallel ridges circumscribing a distant housing portion of the custom in-ear headset.

FIG. 2 is a tip view of the custom in-ear headset 100 depicted on FIG. 1. As previously-mentioned, the distant housing portion 106 is distally terminated in the tip 205. A first ridge 201 and a second ridge 203 are integrally formed with, and circumscribing, the distant housing portion, as indicated by arrow 106. Each ridge projects from the distant housing portion 106 and has a height of about 0.7 mm and a width of about 2.0 mm. However, other embodiments may use different ridge dimensions and comprise fewer, i.e. a single ridge only, or additional ridges. Furthermore, due to the often highly irregular shape of the distant housing portion 106 (conforming to the irregular shape of the user's ear canal), a distance between the first and second ridges around their circumferences may vary considerably from one custom in-ear headset to another. While the first and second ridges, 201, 203, respectively, are essentially parallelly oriented with a distance of about 5 mm in the present embodiment, this distance may vary widely around the housing circumference in other embodiments. Experimental noise attenuation results on a customized in-ear headset with two ridges as described above have demonstrated an impressive ANSI (American National Standards Institute) measured NRR (Noise Reduction Rating) figure of 25.

The distant housing portion 106 is shaped and sized so as to position the first and second ridges, 201, 203, respectively, against a soft cartilaginous portion of the user's ear canal when the custom in-ear headset is mounted. In practice the skilled ear plug/shell technician may determine appropriate positions and dimensions of the first and second ridges, 201, 203, respectively, from an inspection of features and dimensions of the physical ear canal impression. The physical ear canal impression is scanned and a 3-D model or 3-D digital representation thereof is created in suitable 3-D modeling software. Thereafter, the skilled ear plug/shell technician may, under support of a suitable computer display, manually design and position the first and second ridges, 201, 203, respectively, at the earlier determined positions of the distant housing portion 106 on the scanned 3-D model.

Preferably, the ridges have a Shore D hardness larger than 40 such as larger than 60, or even more preferably larger than 80.

In the present embodiment, the housing 101 have been fabricated by a 3-D printing technology wherein the hard hollow shell of the housing 101 has been designed, manipulated and fabricated in a 3-D printing system. A preferred 3-D printing system for implementing these housing design and fabrication steps is available from Objet Geometries Inc. North America under trade names EDEN260 AND ALARIS™30 3D desktop printer. The housing material preferably comprises one or more photopolymer resins available through Objet Geometries Inc. North America and marketed under trade names FULLCURE®630, FULLCURE®655, FULLCURE®680, FULLCURE®720, VEROWHITE™, VEROBLUE™, VEROONE BLACK™.

A customized hollow shell according to another aspect of the present invention may have the same shape and basic functions as the in-ear headset shown in FIGS. 1 and 2. As used herein "a" or "an" means at least one. As used herein, the formulation "at least one of A, B, and C" means "A, or B, or C, or any combination thereof, such as A and B, B and C, A and C, or A, B, and C." The formulation "one of A and B" means A, or B, or A and B. The formulation "exclusively one of A and B" means A only or B only.

The invention claimed is:

1. A custom in-ear headset comprising:
    a housing comprising a proximate housing portion and a distant housing portion, the distant housing portion being shaped and sized to fit inside an ear canal of a user, the housing having a generally irregular outer contour that is shaped and sized to fit the user's ear canal geometry, the proximate housing portion being terminated by an irregularly shaped closed shell face that points outwardly of the user's ear when the custom in-ear headset is mounted therein,
    a miniature speaker acoustically coupled to a sound outlet in the distant portion of the housing for conveying sound pressure to an ear canal of the user,
    at least one of
        a microphone with a sound inlet in the proximate housing portion,
        a bone conduction microphone arranged in the distant housing portion, or
        a microphone with a sound inlet in the distant housing portion,
    at least one ridge projecting from and circumscribing the distant housing portion, wherein said at least one ridge is generally ring-like and has a hardness being sufficient to displace an annular wall portion of a cartilaginous portion of an ear canal of a user when the in-ear headset is inserted into the ear canal of the user, wherein the at least one ridge has a Shore D hardness larger than 40, and wherein the distant housing portion is bent relative to the proximate housing portion so as to fit the at least one ridge in the cartilaginous portion to promote an acoustical seal around the circumference of the distant housing portion.

2. The custom in-ear headset according to claim 1, wherein the housing is shaped and sized to fit the at least one ridge in a cartilaginous portion of the ear canal of the user in an outward manner relative to a second bend of the ear canal toward an ear canal entrance.

3. The custom in-ear headset according to claim 1, comprising exclusively one of: the bone conduction microphone arranged in the distant housing portion and the microphone with the sound inlet in the distant housing portion.

4. The custom in-ear headset according to claim 1, wherein the at least one ridge and the distant housing portion, and/or the at least one ridge and the housing, and/or the proximate housing portion and the distant housing portion are integrally formed in a same material.

5. The custom in-ear headset according to claim 1, wherein the at least one ridge has a Shore D hardness larger than 60, or larger than 80.

6. The custom in-ear headset according to claim 1, wherein the at least one ridge has a height between 0.3 mm and 1.0 mm and a width between 0.5 mm and 5.0 mm or a width between 0.5 mm and 2.5 mm.

7. The custom in-ear headset according to claim 1, wherein the at least one ridge includes a first ridge and a second ridge, and wherein the distant housing portion comprises the first and the second ridges projecting from and circumscribing the distant housing portion.

8. The custom in-ear headset according to claim 7, wherein a smallest distance between the first and second ridges, is larger than 1.0 mm and less than 5.0 mm.

9. The custom in-ear headset according to claim 7, wherein a distance between the first and second ridges varies around a circumference of the distal housing.

10. The custom in-ear headset according to claim 1, wherein the housing material comprises photopolymer including ultraviolet curable material, or fused powdered particles, or a photopolymer resin.

11. The custom in-ear headset according to claim 1, wherein an interior volume of the distant housing portion comprises a filling material or housing material to provide a solid tip in the distant housing portion.

12. The custom in-ear headset according to claim 1, comprising:
    a bone conduction microphone with a vibration pickup member located distantly relative to one of the at least one ridge in a direction toward a tip of the housing; or
    a microphone with a sound inlet located distantly relative to one of the at least one ridge in a direction toward a tip of the housing.

13. The custom in-ear headset according to claim 1, comprising a microphone with a sound inlet arranged in a proximate face of the proximate housing portion.

14. The custom in-ear headset according to claim 1, comprising:
    a signal processor or one or more analog amplifier circuits adapted for receipt and processing of at least one of:
        a first microphone signal generated by the microphone with the sound inlet in the proximate housing portion,
        a second microphone signal generated by the bone conduction microphone arranged in the distant housing portion, and
        a third microphone signal generated by the microphone with the sound inlet in the distant housing portion.

15. A customized hollow shell for placement in an ear canal of a user, comprising:
    a housing comprising
        a proximate shell portion terminating at an outwardly oriented shell face that is irregularly shaped and points outwardly from a user's ear when the hollow shell is placed therein, and
        a distant shell portion shaped and sized to fit inside an ear canal of the user, the housing having a generally irregular outer contour that is shaped and sized to fit the user's ear canal geometry, the proximate shell portion being terminated by an irregularly shaped closed shell face that points outwardly of the user's ear when the hollow shell is placed therein, and at least one ridge projecting from and circumscribing the distant shell portion, wherein the at least one ridge is generally ring-like and has a Shore D hardness larger than 40 to displace an annular wall portion of a cartilaginous portion of an ear canal of a user when the in-ear headset is inserted into the ear canal of the user, and wherein the distant shell portion is bent relative to the proximate shell portion so as to fit the at least one ridge in the cartilaginous portion to promote an acoustical seal around the circumference of the distant shell portion.

16. The customized hollow shell according to claim 15, wherein the outwardly oriented shell face comprises an opening for receipt of a signal processor assembly comprising a signal processor coupled to a microphone and a loudspeaker, and wherein the distant shell portion comprises a sound outlet coupled to the loudspeaker.

17. The customized hollow shell according to claim 15, wherein the at least one ridge and the distant shell portion and/or the at least one ridge and the housing, and/or the proximate shell portion and the distant shell portion are integrally formed in same material.

18. The customized hollow shell according to claims 15, wherein the at least one ridge has a Shore D hardness larger than 60 or larger than 80.

19. The customized hollow shell according to claim 15, wherein the at least one ridge has a height between 0.3 mm and 1.0 mm and a width between 0.5 mm and 5.0 mm, preferably a width between 0.5 mm and 2.5 mm.

20. The customized hollow shell according to claim 15, wherein the hollow shell is shaped and sized to fit the at least one ridge in a cartilaginous portion of the user's ear canal in an outward manner relative to a second bend of the ear canal toward an ear canal entrance.

21. The customized hollow shell according to claim 15, wherein the distant shell portion comprises a first and a second ridge projecting from and circumscribing the distant housing portion.

22. The customized hollow shell according to claim 21, wherein the smallest distance between the first and second ridges, measured in tangential direction to the first ridge, is larger than 1.0 mm and less than 5.0 mm.

23. The customized hollow shell according to claim 21, wherein a distance between the first and second ridges varies around a circumference of the distal housing.

24. The customized hollow shell according to claim 15, wherein shell material comprises photopolymer including ultraviolet curable material, or fused powdered particles, or a photopolymer resin.

25. The customized hollow shell according to claim 15, wherein an interior volume of the distant shell portion comprises a filling material or shell material to provide a solid tip in the distant housing portion.

26. The custom in-ear headset according to claim 1, wherein the first ridge has a generally constant width around the circumference of the distant housing portion that the first ridge circumscribes.

* * * * *